US009328785B2

(12) United States Patent
Scheibe et al.

(10) Patent No.: US 9,328,785 B2
(45) Date of Patent: May 3, 2016

(54) TENSIONED BRAKE PAD

(71) Applicant: HB Performance Systems, Inc., Mequon, WI (US)

(72) Inventors: Steve Scheibe, Florence, WI (US); Noah Chapman, Milwaukee, WI (US)

(73) Assignee: HB PERFORMANCE SYSTEMS, INC., Mequon, WI (US)

( * ) Notice: Subject to any disclaimer, the term of this patent is extended or adjusted under 35 U.S.C. 154(b) by 244 days.

(21) Appl. No.: 13/843,692

(22) Filed: Mar. 15, 2013

(65) Prior Publication Data
US 2014/0262638 A1 Sep. 18, 2014

(51) Int. Cl.
*F16D 65/092* (2006.01)
*F16D 65/095* (2006.01)
*F16D 65/00* (2006.01)
*F16D 65/12* (2006.01)

(52) U.S. Cl.
CPC .......... *F16D 65/0075* (2013.01); *F16D 65/092* (2013.01); *F16D 65/095* (2013.01); *F16D 65/12* (2013.01)

(58) Field of Classification Search
CPC ................ F16D 55/2265; F16D 55/2262
USPC ............. 188/73.31–73.39, 73.41–73.47
See application file for complete search history.

(56) References Cited

U.S. PATENT DOCUMENTS

| | | | |
|---|---|---|---|
| 4,044,864 A * | 8/1977 | Karasudani | 188/73.39 |
| 4,219,106 A * | 8/1980 | Lupertz et al. | 188/73.32 |
| 4,846,312 A | 7/1989 | Sweetmore et al. | |
| 5,111,914 A * | 5/1992 | Thiel et al. | 188/73.34 |
| 5,297,659 A | 3/1994 | Thiel et al. | |
| 5,427,213 A | 6/1995 | Weiler et al. | |
| 5,551,537 A * | 9/1996 | Mery et al. | 188/73.39 |

(Continued)

FOREIGN PATENT DOCUMENTS

| | | |
|---|---|---|
| EP | 1304496 | 4/2003 |
| WO | 2004/010020 | 1/2004 |

(Continued)

OTHER PUBLICATIONS

Written Opinion from the International Searching Authority for Application No. PCT/US2014/027849 dated Jul. 25, 2014 (6 pages).

(Continued)

*Primary Examiner* — Robert A Siconolfi
*Assistant Examiner* — James Hsiao
(74) *Attorney, Agent, or Firm* — Michael Best & Friedrich LLP

(57) ABSTRACT

A brake caliper assembly comprising a housing including inlet and outlet ends collectively defining forward and rearward directions. The housing includes an abutting surface facing in the rearward direction and positioned closer to the inlet end than to the outlet end. A pad assembly includes an engaging surface in engagement with the abutting surface to thereby substantially prevent movement of the pad assembly in the forward direction. The outlet end of the housing is free from a feature that substantially prevents movement of the pad assembly in the forward direction. The pad assembly includes a base and a projection extending from the base in the rearward direction and defining the engaging surface. The outlet end of the pad assembly can include an alignment member extending in the forward direction and engaging the housing in a direction substantially perpendicular to the forward direction.

18 Claims, 4 Drawing Sheets

(56) References Cited

U.S. PATENT DOCUMENTS

| | | | |
|---|---|---|---|
| 5,588,508 A * | 12/1996 | Le Deit | 188/73.31 |
| 5,620,064 A | 4/1997 | Sano | |
| 5,829,555 A | 11/1998 | Anda et al. | |
| 6,039,155 A * | 3/2000 | Demoise, Jr. | 188/73.39 |
| 6,250,440 B1 * | 6/2001 | Mery et al. | 188/73.44 |
| 6,318,514 B1 | 11/2001 | Hinkens et al. | |
| 6,533,080 B2 * | 3/2003 | Miyata | 188/73.37 |
| 6,648,104 B1 | 11/2003 | Buckley et al. | |
| 6,725,981 B1 | 4/2004 | Franz | |
| 7,377,368 B2 * | 5/2008 | Schog et al. | 188/73.31 |
| 7,438,160 B2 | 10/2008 | Maehara | |
| 8,196,716 B2 * | 6/2012 | Schorn et al. | 188/73.47 |
| 8,556,046 B2 | 10/2013 | Ciotti et al. | |
| 2009/0071768 A1 | 3/2009 | Paulsen | |
| 2009/0218180 A1 | 9/2009 | Roberts et al. | |
| 2009/0236187 A1 * | 9/2009 | Bach et al. | 188/72.5 |
| 2010/0193300 A1 | 8/2010 | Saito et al. | |
| 2010/0219030 A1 * | 9/2010 | Klimt et al. | 188/250 F |
| 2012/0085597 A1 | 4/2012 | Narayanan | |

FOREIGN PATENT DOCUMENTS

| | | |
|---|---|---|
| WO | 2009/016675 | 2/2009 |
| WO | 2009/050751 | 4/2009 |
| WO | 2011/145678 | 11/2011 |

OTHER PUBLICATIONS

International Search Report and Written Opinion of the International Searching Authority for Application No. PCT/US2014/027849 dated Jul. 25, 2014 (7 pages).

International Preliminary Report on Patentability for Application No. PCT/US14/027849 dated Jan. 22, 2015 (14 pages).

* cited by examiner

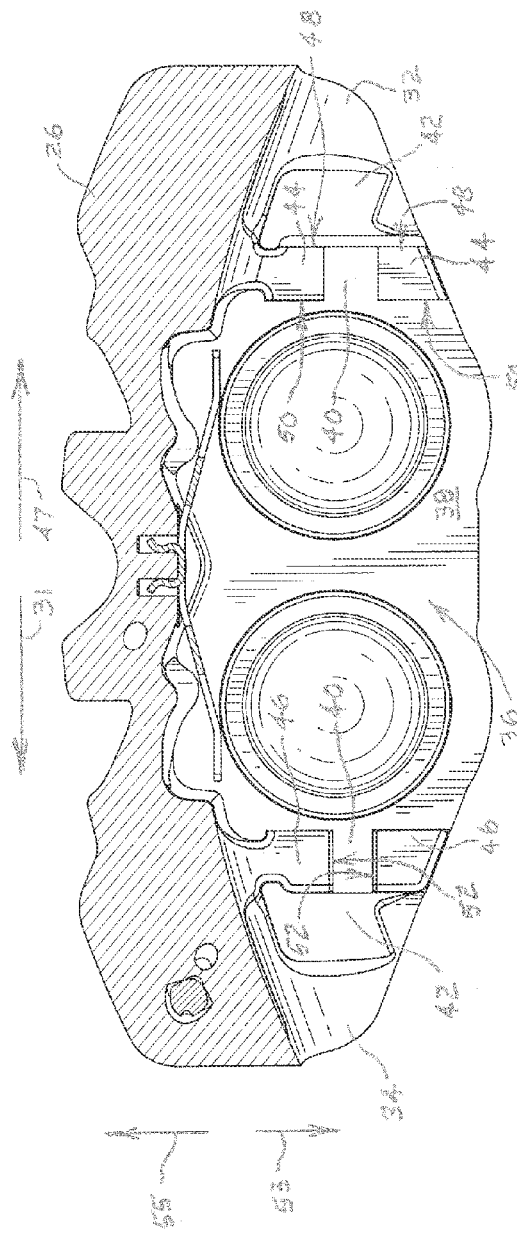

TENSIONED BRAKE PAD

BACKGROUND

The present invention relates generally to vehicle braking systems, and more specifically to disc braking systems using brake pads.

Disc braking systems commonly include a disc mounted to a vehicle wheel and a caliper mounted to a non-rotational part of the vehicle. The caliper typically includes brake pads positioned on opposing sides of the disc and pistons for moving the pads into contact with the disc. During braking, the piston moves the pads into contact with the rotating disc to create friction that inhibits rotation of the disc and slows the vehicle.

Brake pads are often mounted on carrier plates that support the pads in a caliper housing. Each carrier plate typically includes an engaging surface defining an end of the carrier, and the caliper housing include a corresponding abutting surface against which the engaging surface is forced while braking A brake pad of this type is disclosed in U.S. Pat. Nos. 6,318,514 and 6,648,104, which are hereby incorporated by reference in their entirety.

SUMMARY

The present invention provides a brake caliper assembly comprising a housing and a pad assembly. The housing is adapted to be secured to a vehicle and including a channel adapted to receive a brake disc. The housing includes an inlet end and an outlet end, the inlet and outlet ends of the housing defining a rearward direction toward the inlet end and a forward direction toward the outlet end. The housing further includes an abutting surface facing in the rearward direction and positioned closer to the inlet end than to the outlet end. The pad assembly is positioned on a side of the channel and includes an engaging surface in engagement with the abutting surface to thereby substantially prevent movement of the pad assembly in the forward direction relative to the housing. The outlet end of the housing is free from a feature that substantially prevents movement of the pad assembly in the forward direction relative to the housing.

In one embodiment, the pad assembly includes a base and a projection extending from the base in the rearward direction and defining the engaging surface. For example, the projection includes a neck extending in the rearward direction and a head extending substantially perpendicular to the neck and defining the engaging surface. The head can extend substantially perpendicular to the neck in two opposing directions to define a T-shaped projection to thereby define the engaging surface on one side of the neck and a second engaging surface on an opposing side of the neck.

The engaging surface is preferably adjacent an inlet end of the pad assembly, and the pad assembly includes an outlet end opposite the inlet end. The outlet end of the pad assembly can include an alignment member extending in the forward direction and engaging the housing in a direction substantially perpendicular to the forward direction. Preferably, the outlet end of the pad assembly is substantially free from a feature that prevents movement of the pad assembly in the forward direction relative to the housing.

The housing can also include a second abutting surface facing in the forward direction and positioned closer to the inlet end of the housing than to the outlet end of the housing. The pad assembly includes a second engaging surface in facing relation to the second abutting surface to thereby substantially prevent movement of the pad assembly in the rearward direction relative to the housing. The outlet end of both the housing and the pad assembly are substantially free from a feature that prevents movement of the pad assembly in the rearward direction relative to the housing.

Other aspects of the invention will become apparent by consideration of the detailed description and accompanying drawings.

BRIEF DESCRIPTION OF THE DRAWINGS

FIG. 3 is a section view taken along line 3-3 in FIG. 2 with the brake pad assembly removed.

FIG. 4 is the section view of FIG. 3 showing the position of a brake bad assembly during forward braking.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
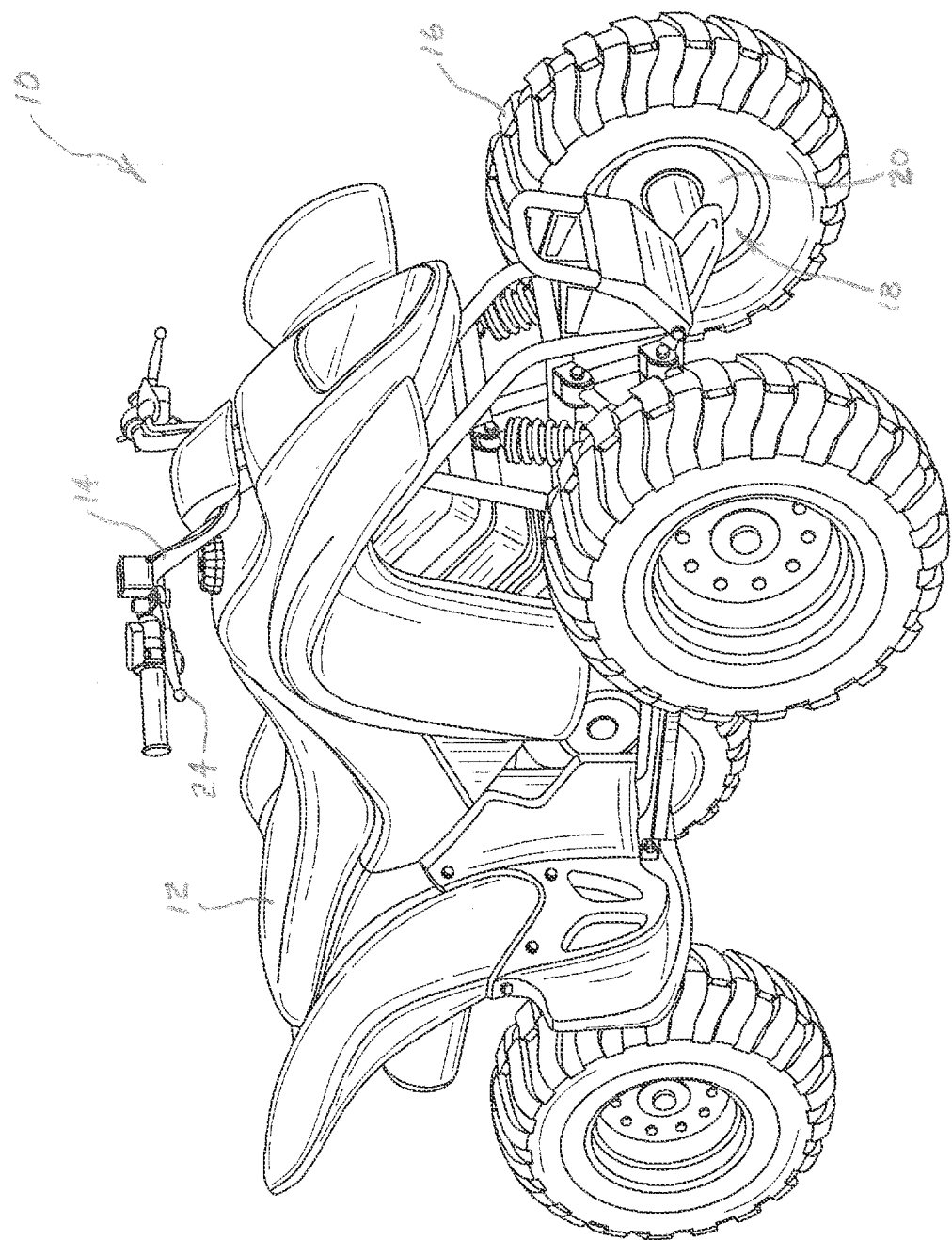
FIG. 1 illustrates an ATV having a brake caliper embodying the present invention.

FIG. 1 illustrates an ATV 10 having a seat 12, handlebars 14, and four wheels 16. Each of the wheels 16 includes a disc brake assembly 18 having a rotor 20 fixed to each wheel 16 at a caliper assembly 22 (FIG. 2) coupled to the vehicle frame and positioned to engage the rotor 20. Upon actuation of a hand lever 24 on the handlebars, each of the caliper assemblies 22 will engage the corresponding rotor 20 to slow the vehicle.

Figure 2:
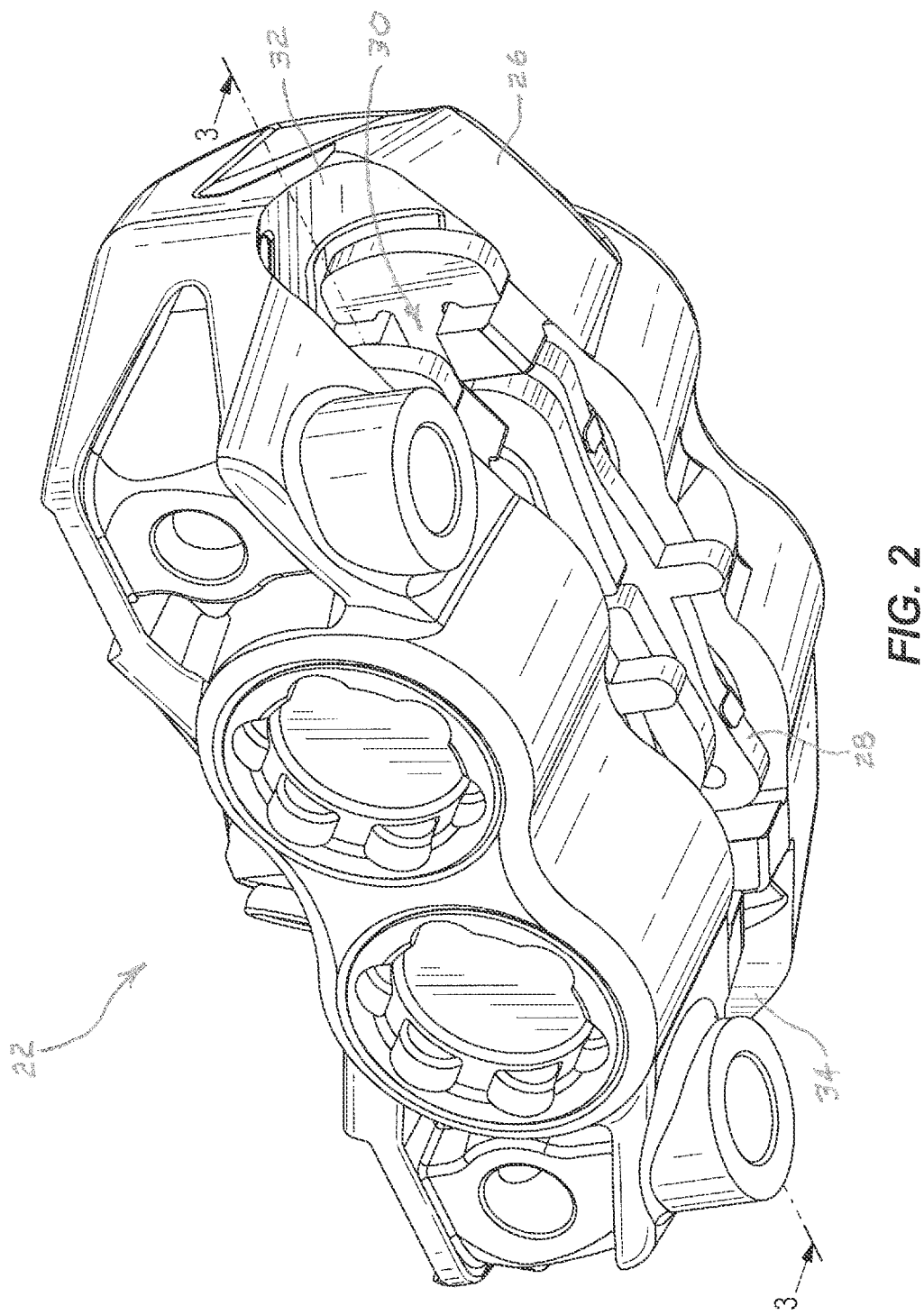
FIG. 2 is a perspective view of the brake caliper of FIG. 1.

Referring to FIGS. 2-4, each caliper assembly 22 includes a caliper housing 26 and a pair of pad assemblies 28. The caliper housing 26 includes a channel 30 that receives the corresponding rotor 20. When the vehicle is moving in a forward direction, the rotor 20 will rotate relative to and pass through the caliper housing 26 in a forward direction 31, thereby defining an inlet end 32 and outlet end 34 of the caliper housing 26. The caliper housing 26 is preferably a one-piece or two-piece structure that is manufactured as a single casting or forging, but could instead be made from multiple pieces.

FIG. 3 illustrates half of the caliper housing 26 (in section). The other half of the caliper housing 26 (in facing relation to the structure or illustrated in FIG. 3) is essentially a mirror image of the structure illustrated into 3, and therefore only one half of the caliper housing 26 will be described in detail. Each side of the caliper housing 26 includes a recess 36 adapted to receive one of the pad assemblies 28. The recess 36 includes a main portion 38, two narrow slot portions 40 extending from opposing ends of the main portion 38, and two end portions 42 coupled to opposing ends of the slot portions 40. To define the boundary between the main portion 38 and the end portions 42 (on opposing sides of the slot portions 40), the caliper housing 26 includes two raised inlet abutments 44 and two raised outlet abutments 46.

First abutting surfaces 48 are defined on the inlet abutments 44 (positioned near the inlet end 32 of the caliper housing 26). The first abutting surfaces 48 face in a rearward direction and are positioned on opposing sides of the corresponding slot portion 40 of the recess 36. Second abutting surfaces 50 are defined on the opposite side of the inlet abutments 44 as the first abutting surfaces 48. The second abutting surfaces 50 face in the forward direction 31 and are positioned on opposing sides of the corresponding slot portion 40. The outlet abutments 46 define third abutting surfaces 52 on opposing sides of the slot portion 40 near the outlet end of the caliper housing 26. One of the third abutting surfaces 52 faces in a direction perpendicular to the forward direction 31 and parallel to a plane defined by the rotor 20, and the other third abutting surface 52 faces in an opposite direction. These two directions can be described as radially inward 53 and radially outward 55 (in relation to the rotor).

Figure 5:
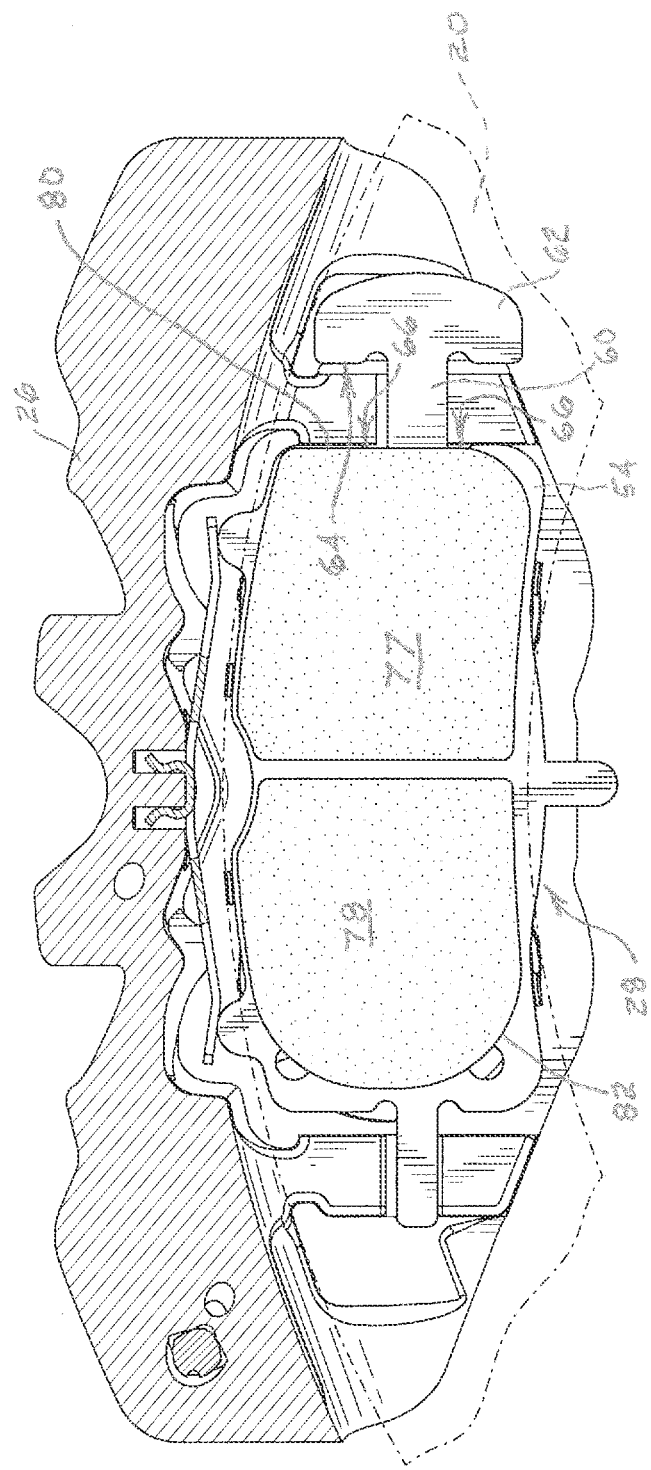
FIG. 5 is the section view of FIG. 3 showing the position of the brake pad during rearward braking.

Referring to FIGS. 4-5, the pad assembly 28 is dimensioned to fit into the recess 36 defined in the caliper housing 26, such that each pad assembly 28 is positioned on a side of the channel 30 that receives the rotor 20. The pad assembly 28 includes a base 54 and a projection extending in the rearward direction 47 from an inlet end of the base 54. The projection includes a neck 60 extending in the rearward direction and a head 62 extending substantially perpendicular to the neck 60 in the radially inward 53 and radially outward 55 directions to thereby define a T-shaped/L-shaped projection. Each side of the head 62 (on opposing sides of the neck 60) includes a first engaging surface 64 facing in the forward direction 31 and aligned with a corresponding first abutting surface 48 of the caliper housing 26. The inlet end of the pad assembly 28 further includes second engaging surfaces 66 defined on the edge of the base 54 (on opposing sides of the neck) and facing in the rearward direction 47. The second engaging surfaces 66 are aligned with the corresponding second abutting surfaces 50 of the caliper housing 26.

The pad assembly 28 further includes an alignment member 68 extending in the forward direction 31 from an outlet end of the base 54. The alignment member 68 is positioned in the slot portion 40 near the outlet end 34 of the caliper housing 26. The alignment member 68 includes an alignment surface 72 facing in the radially outward direction 55 and another alignment surface 74 facing in the radially inward direction 53. The alignment surfaces 72, 74 are positioned in facing relation to the third abutting surfaces 52 of the caliper housing 26. In this regard, contact between the alignment surfaces 72, 74 and the third abutting surfaces 52 maintains an appropriate inward-outward orientation of the pad assembly 28 relative to the caliper housing 26. However, it is noted that neither the alignment member 68 nor any other structural feature near the outlet end of the caliper housing 26 provides a substantial resistance to forward and rearward movement of the pad assembly 28 relative to the caliper housing 26.

The illustrated pad assembly 28 includes a pad carrier that defines most of the above-described structure, including the base 54, projection (neck 60 and head 62), alignment member 68, and engaging surfaces. The pad assembly 28 further includes an inlet pad 77 and an outlet pad 78 secured to the base 54. The inlet pad 77 has an inlet edge 80 that is shaped differently than an outlet edge 82 of the outlet pad 78. Specifically, the inlet edge 80 is substantially straight and substantially perpendicular to the forward and rearward directions 31,47. In contrast, the outlet edge 82 is curved and has a radius R that approximately half of the height H of the outlet pad 78. The centerline C of the pads 77,78 is offset from both the projection (defined by the neck 60) and the alignment member 68 (the projection and alignment member 68 are spaced radially inward relative to the centerline C).

In operation, when the vehicle is moving forward, the brake rotor 20 rotates relative to the brake caliper assembly 22 in the forward direction 31. When braking in this situation, the pad assemblies 28 will contact the rotor 20 and be forced in the forward direction 31 relative to the caliper housing 26 (as illustrated in FIG. 4), resulting in the first engaging surfaces 64 of the pad assembly 28 contacting the first abutting surfaces 48 of the caliper housing 26. There are no other surfaces of the caliper housing 26 that are inhibiting forward motion of the pad assembly 28 relative to the caliper housing 26. In this configuration, it can be seen that the braking forces applied by the rotor 20 on the pad assembly 28 are in a direction away from resisting forces applied by the caliper housing 26 on the pad assembly 28, resulting in the pad assembly 28 being in tension during the forward braking operation.

When the vehicle is moving rearward, the brake rotor 20 rotates relative to the brake caliper assembly 22 in the rearward direction 47. When braking in this situation, the pad assemblies 28 will contact the rotor 20 and be forced in the rearward direction 47 relative to the caliber housing 26 (as illustrated in FIG. 5), resulting in the second engaging surfaces 66 of the pad assembly 28 contacting the second abutting surfaces 50 of the caliper housing 26. There are no other surfaces of the caliper housing 26 that are inhibiting rearward motion of the pad assembly 28 relative to the caliper housing 26. In this configuration, it can be seen that the braking forces applied by the rotor 20 on the pad assembly 28 are in a direction toward resisting forces applied by the caliper housing 26 on the pad assembly 28, resulting in the pad assembly 28 being in compression during the rearward braking operation.

In an alternative configuration, the alignment member 68 could be T-shaped or L-shaped, similar to the neck 60 and head 62, in order to inhibit rearward motion of the pad assembly 28 relative to the caliper housing 26 while placing the pad assembly 28 in tension during the rearward braking operation.

While the illustrated embodiment discloses an ATV, it should be understood that the features of the present invention can also be applied to other vehicles, such as motorcycles, bicycles, and snowmobiles.

The invention claimed is:

1. A brake caliper assembly comprising:
   a housing adapted to be secured to a vehicle and including a channel adapted to receive a brake disc, the housing having an inlet end and an outlet end, the inlet and outlet ends of the housing defining a rearward direction toward the inlet end and a forward direction toward the outlet end, and the housing further including an abutting surface facing in the rearward direction and positioned closer to the inlet end than to the outlet end;
   a pad assembly positioned on a side of the channel and including an engaging surface adjacent to and in engagement with the abutting surface to thereby prevent movement of the pad assembly in the forward direction relative to the housing, wherein an end of the pad assembly adjacent the outlet end of the housing does not contact a rearward facing surface of the outlet end of the housing during braking.

2. A brake caliper assembly as claimed in claim 1, wherein the pad assembly includes a base and a projection extending from the base in the rearward direction, wherein the engaging surface is on the projection.

3. A brake caliper assembly as claimed in claim 2, wherein the projection includes a neck extending in the rearward direction and a head extending substantially perpendicular to the neck and defining the engaging surface.

4. A brake caliper assembly as claimed in claim 3, wherein the head extends substantially perpendicular to the neck in two opposing directions, wherein the head defines the engaging surface on one side of the neck and a second engaging surface on an opposing side of the neck, wherein both engaging surfaces face in the forward direction.

5. A brake caliper assembly as claimed in claim 1, wherein the engaging surface is on an inlet end of the pad assembly, wherein the end of the pad assembly adjacent the outlet end of the housing includes an alignment member extending in the forward direction, the alignment member engaging the housing in a direction substantially perpendicular to the forward direction.

6. A brake caliper assembly as claimed in claim 1, wherein the housing includes a second abutting surface facing in the forward direction and positioned closer to the inlet end of the housing than to the outlet end of the housing, and wherein the pad assembly includes a second engaging surface in facing relation to the second abutting surface to thereby prevent movement of the pad assembly in the rearward direction relative to the housing.

7. A brake pad assembly adapted to be positioned in a disc brake caliper and engageable with a brake disc for slowing a vehicle, the brake pad assembly comprising:
   a base having a braking surface, an inlet end, and an outlet end, the base defining a forward direction from the inlet end toward the outlet end and a rearward direction opposite of the forward direction;
   a projection extending from the inlet end of the base and including a neck extending in the rearward direction and a head extending substantially perpendicular to the neck and defining an engaging surface facing in the forward direction; and
   wherein the head extends substantially perpendicular to the neck in two opposing directions, wherein the head defines the engaging surface on one side of the neck and another engaging surface on an opposing side of the neck, where each engaging surface faces in the forward direction;
   wherein the outlet end of the base includes no engaging surface facing in the forward direction that contacts an abutting surface of a housing of the brake caliper during braking.

8. A brake pad assembly as claimed in claim 7, further comprising an alignment member extending in the forward direction from the outlet end of the base.

9. A brake pad assembly as claimed in claim 8, wherein the alignment member includes no engaging surface facing in the forward direction, such that the alignment member is configured to move freely into and out of an aperture in a brake caliper housing.

10. A brake pad assembly as claimed in claim 7, wherein the engaging surface is a first engaging surface, and wherein the pad assembly includes a second engaging surface facing in the rearward direction.

11. A brake pad assembly as claimed in claim 10, wherein the second engaging surface is defined by an edge of the base.

12. A brake pad assembly as claimed in claim 10, wherein the second engaging surface is in facing relation to the first engaging surface.

13. A brake pad assembly as claimed in claim 10, wherein the second engaging surface is positioned on one side of the neck and another second engaging surface is positioned on an opposing side of the neck.

14. A brake caliper assembly as claimed in claim 1, wherein the pad assembly includes the end adjacent the outlet end of the housing including an alignment member that does not contact a rearward or forward facing surface of the housing when a braking force is applied.

15. A brake caliper assembly as claimed in claim 1, wherein the brake pad assembly is placed into tension while a braking force is applied in the forward direction.

16. The brake caliper assembly as claimed in claim 1, wherein the housing includes an aperture adjacent the outlet end of the housing, wherein the pad assembly includes an alignment member that is movable within the aperture.

17. The brake caliper assembly as claimed in claim 16, wherein the alignment member extends through the aperture.

18. A brake caliper assembly comprising:
   a housing adapted to be secured to a vehicle and including a channel adapted to receive a brake disc, the housing having an inlet end and an outlet end, the inlet and outlet ends of the housing defining a rearward direction toward the inlet end and a forward direction toward the outlet end, and the housing further including a first abutting surface facing in the rearward direction and positioned closer to the inlet end than to the outlet end and at least one second abutting surface positioned closer to the outlet end than to the inlet end and facing in a direction orthogonal to the forward direction;
   a pad assembly positioned on a side of the channel and including an engaging surface in engagement with the first abutting surface to thereby substantially prevent movement of the pad assembly in the forward direction relative to the housing, and an alignment member including a surface facing the at least one second abutting surface;
   wherein the surface facing the at least one second abutting surface engages the at least one second abutting surface to guide movement of the pad assembly relative to the forward direction during braking, and wherein the alignment member does not contact the housing to prevent movement of the pad assembly in the forward direction relative to the housing during braking.

* * * * *